May 15, 1928.  1,669,779

W. REAVELL

ROTARY COMPRESSOR, EXHAUSTER, AND ENGINE

Filed Aug. 27. 1927   2 Sheets-Sheet 2

Inventor
William Reavell
By Dowell & Dowell
Attorneys

Patented May 15, 1928.

1,669,779

UNITED STATES PATENT OFFICE.

WILLIAM REAVELL, OF IPSWICH, ENGLAND.

ROTARY COMPRESSOR, EXHAUSTER, AND ENGINE.

Application filed August 27, 1927, Serial No. 215,951, and in Great Britain May 17, 1926.

This invention has reference to rotary compressors, exhausters and engines of the crescent chamber type and the object of the invention is to prevent the sliding blades of the rotor, when driven outwards by centrifugal force, from pressing or rubbing against the fixed casing or stator. Various arrangements have been proposed for this purpose including the provision of a freely rotating perforated drum against which the tips of the blades bear as described in the specification of Letters Patent No. 1,345,955. It has also been proposed to provide the blades with balls or rollers which bear against the interior of rings which are either secured to the end covers of the fixed casing or stator or are designed to rotate around guides fixed to the end covers, the balls or rollers being constrained by the rings to roll on the convex surfaces of the guides. Although such arrangements provide for determining the path of the blade tips relatively to the interior of the casing or stator, they are unsuitable for machines driven at ordinary high speeds as very high rotational velocities are imparted to the blade balls or rollers.

Now according to the present invention the balls or rollers carried by the blades cooperate with tracks that are themselves free to rotate upon other balls or rollers and serve to guide the blades and prevent their tips bearing against the casing or stator though they move in close proximity thereto. By this arrangement, the rotational velocity of the blade balls or rollers is small as the tracks against which they bear offer such light resistance to rotation, with the result that the machines can be driven at high speeds without undue friction or wear. High efficiency can be obtained and, in the case of compressors, the heat generated by compression may be readily dissipated by providing the casing or stator with suitable means such as gills or fins or a water jacket.

Various constructions whereby balls or rollers carried by the blades cooperate with freely rotatable ball or roller borne tracks to limit or determine the path of the blade tips may be adopted. For instance, balls or rollers may be mounted on circular pins or ferrules attached to projections from the ends of the blades, these balls or rollers rolling on the interior of freely rotatable ball or roller borne tracks or races carried by the end covers of the machine; the tracks or races against which the blade balls or rollers bear may surround or be surrounded by companion ball or roller tracks fixed to the end covers, concentricity of the tracks being maintained by the interposed balls or rollers and the movable tracks or races being extended towards the blade ends, if required, to accommodate the balls or rollers carried thereby.

The projections from the blade ends on which the balls or rollers are mounted may be integral parts of the blades or they may be constituted by parts welded, riveted or otherwise attached thereto, which parts may form the journals for the balls or rollers; in the latter case each journal may be formed with an arm of channel shape which fits the end of the blade and is attached thereto.

In some cases, an additional track or guide ring for the blade balls or rollers may be formed on or attached to the end covers so as to limit the movements of the blades inwardly or away from the track which determines the path of the blade tips when running; such additional track or guide ring need not be complete as gravity will prevent the blades moving away from the stator during their angular movement through the lower part of their path. In some cases the additional track or guide rings may form part of the ball track or race.

Owing to the use of a large ball bearing in the end covers, forming a revolving track concentric with the casing, and the use of balls or rollers journalled on the blades, which slide in grooves in the rotor eccentric with said casing, it is found that the tips of the blades do not describe a perfect circle. This is due to the constantly differing angularity of the blades with relation to the casing as the rotor revolves. In order to ensure that the blades shall work with as fine a clearance as possible inside the casing, the said casing may be formed or produced by machining or boring in such a manner that its internal surface conforms as closely as possible with the path actually described by the tips of the blades.

In the accompanying drawings, Figs. 1 and 2 are respectively a longitudinal section and a cross-section in two planes showing one construction of a compressor according to the invention, which is illustrated by way of example only, as the construction can be variously modified as previously described.

Figs. 3 and 4 are detail views illustrating modifications.

Referring to the drawings, $a$ is the stationary cylindrical stator or casing formed with a suction or inlet port $b$ and an outlet or delivery port $c$ and two end covers $d$ provided with eccentrically disposed bearings $e$, for the driving spindle $f$ of the rotor $g$ carrying the radially sliding blades $h$ the ends of which are over-lapped by inner end walls $i$. $k$ $k$ are tracks mounted on ball bearings $l$ in the end covers $d$ concentric with the interior of the casing $a$ and serve as guide tracks for rollers $m$ mounted on journals $n$ formed on or attached to the blades as shown.

$o$ $o$ are additional tracks on the end covers to limit the inward movements of the blades when the machine is at rest or revolving slowly as when starting up.

The casing $a$ is shown provided with gills or fins $a^1$ for air cooling but it may be water jacketted for the same purpose.

What I claim is:—

Figure 1:
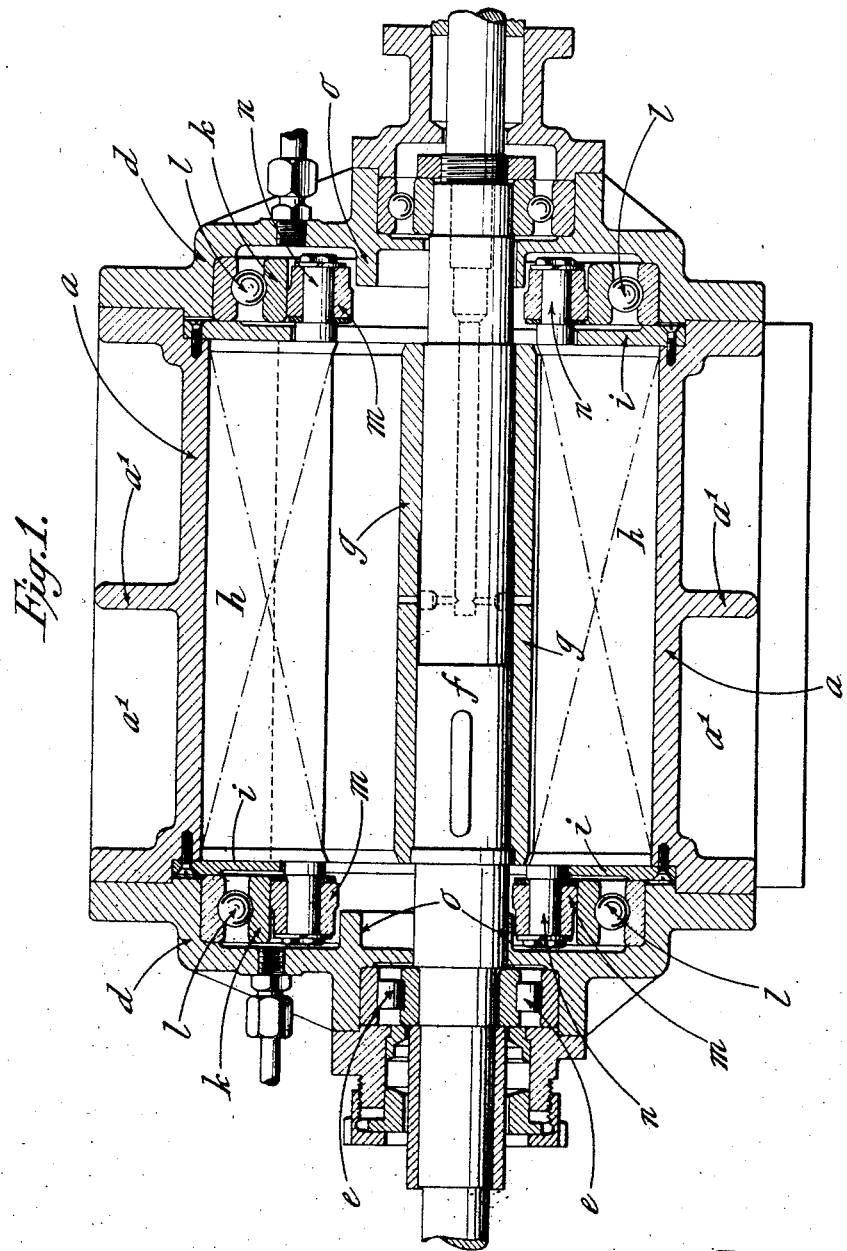
Figure 2:
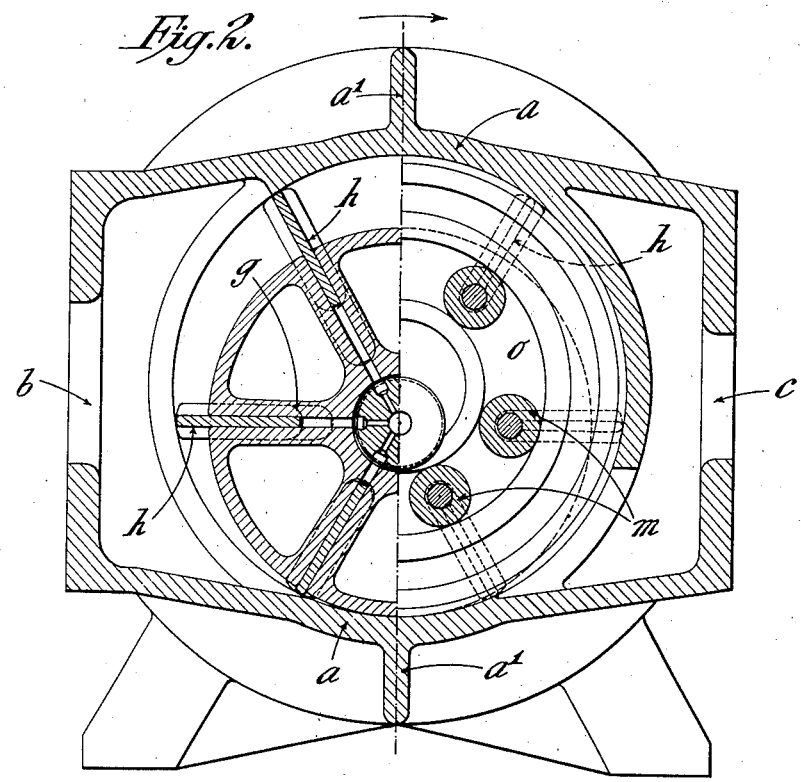
Figure 3:
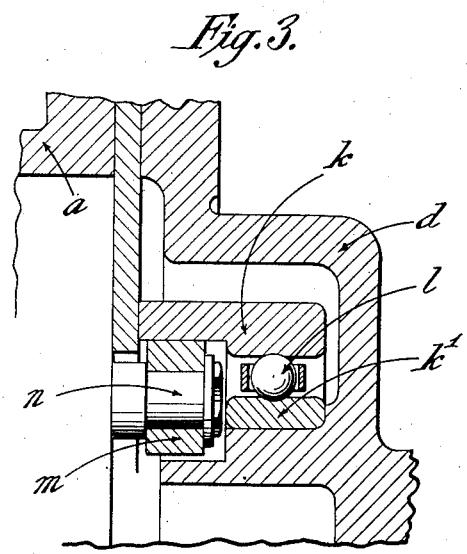
Fig. 3 illustrates an arrangement in which the rollers $m$ bear against axially inward extensions of the freely rotatable outer tracks $k$ of the ball bearings $l$, the inner tracks $k^1$ of which are fixed to the end covers.
Figure 4:
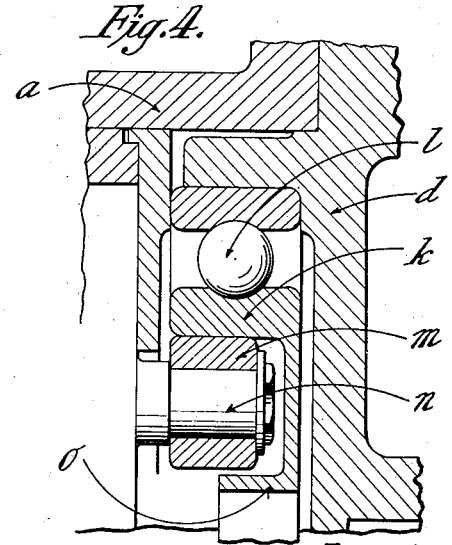
Fig. 4 illustrates an arrangement in which the additional tracks $o$ are formed integrally with the tracks $k$.

1. In a rotary compressor, exhauster or engine embodying a stationary casing and rotor element having radially slidable blades, means providing stationary wall-portions overlappingg the ends of the blades without contacting the same, means for controlling the sliding movement of said blades and preventing the tips thereof from frictioning against the opposing wall of said casing as the rotor element rotates therein, said means comprising rotatable tracks anti-frictionally supported in the ends of the casing on the outer sides of said wall-portions in corresponding relation eccentrically of the axis of the rotor, and rollers carried by said blades and bearing on said tracks for thereby limiting the sliding movement of the blades under centrifugal force of rotation.

2. In a rotary compressor, exhauster or engine embodying a stator and rotor having radially slidable blades, means providing stationary wall-portions overlapping the sides of the blades without contacting the latter, means for limiting the outward movement of said blades under centrifugal force to prevent the ends thereof from frictioning against the opposing wall of the stator as the rotor rotates therein, said means comprising rotatable tracks anti-frictionally supported in the ends of the stator on the outer sides of said wall-portions in corresponding relation eccentrically of the axis of the rotor and concentrically of guide-rings therefor, and rollers carried on said blades and bearing normally on the inner surfaces of said tracks for limiting the outward sliding movement of the blades.

3. A rotary compressor of the character described comprising in combination, a casing having inlet and outlet ports, end covers for said casing, a driving spindle journaled eccentrically in said covers, a rotor mounted on said spindle within said casing and having radially slidable blades, journals carried by said blades on which rollers are mounted, stationary wall-portions overlapping the sides of the blades, rotatable tracks encircling the rollers of said blades on the outer sides of said wall-portions and against which said rollers normally bear for limiting the sliding movement of said blades, and means anti-frictionally supporting said tracks to rotate within said covers at the ends of the casing.

4. A rotary compressor of the character described comprising in combination, a casing having inlet and outlet ports, end covers for said casing, a driving spindle journaled eccentrically in said end covers, a rotor mounted on said spindle within said casing and having radially slidable blades, journals on said blades on which anti-friction rollers are carried, stationary wall-portions overlapping the ends of the blades, rotatable tracks encircling the rollers of the several rotor blades on the outer sides of said wall-portions and against which said rollers normally bear for limiting the outward sliding movement of the blades, and ball guide-rings fitted in the covers at the ends of the casing upon which said tracks are anti-frictionally supported by intermediate balls.

Signed at London, England, this eighteenth day of August, 1927.

WILLIAM REAVELL.